United States Patent Office 3,261,574
Patented July 19, 1966

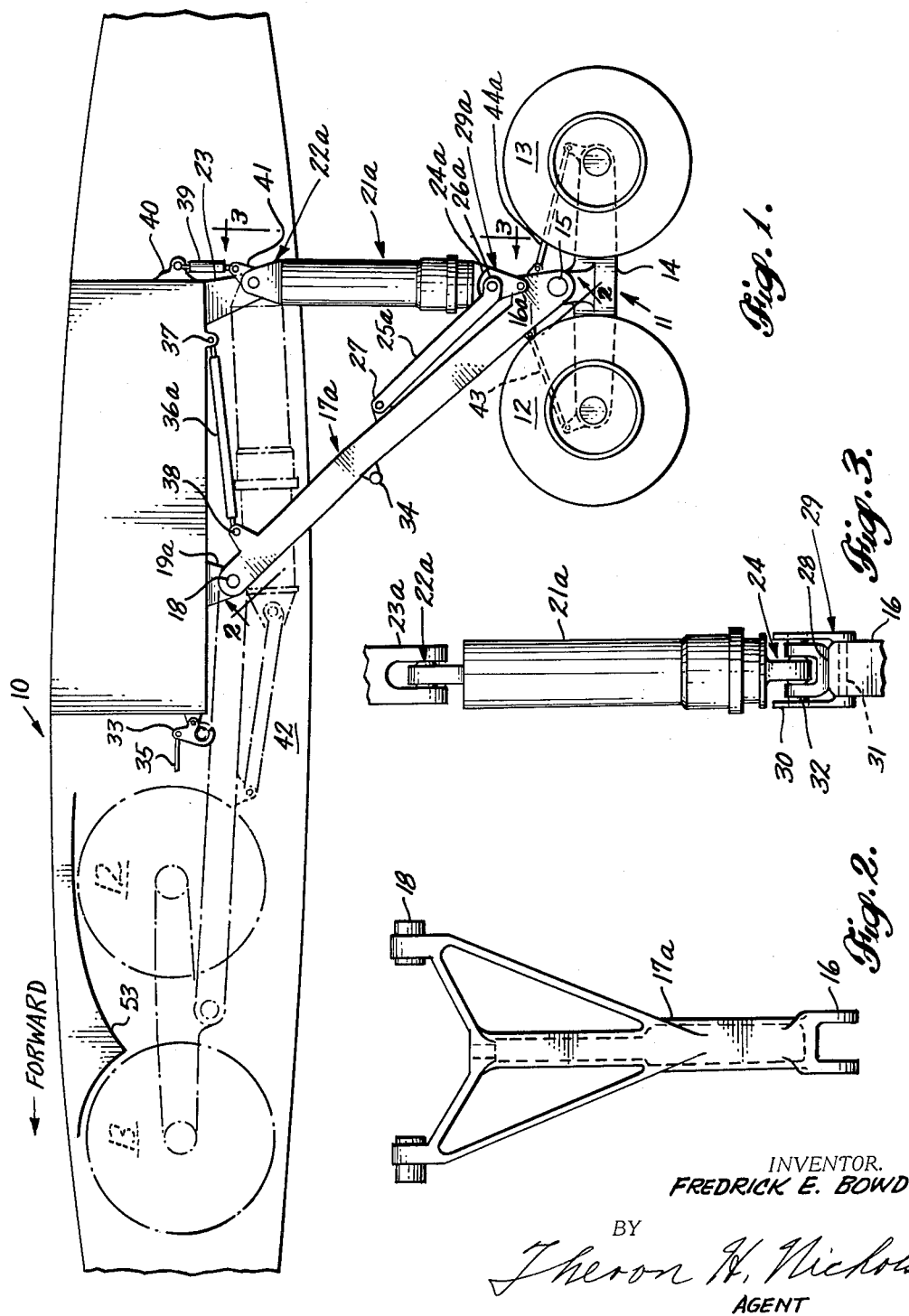

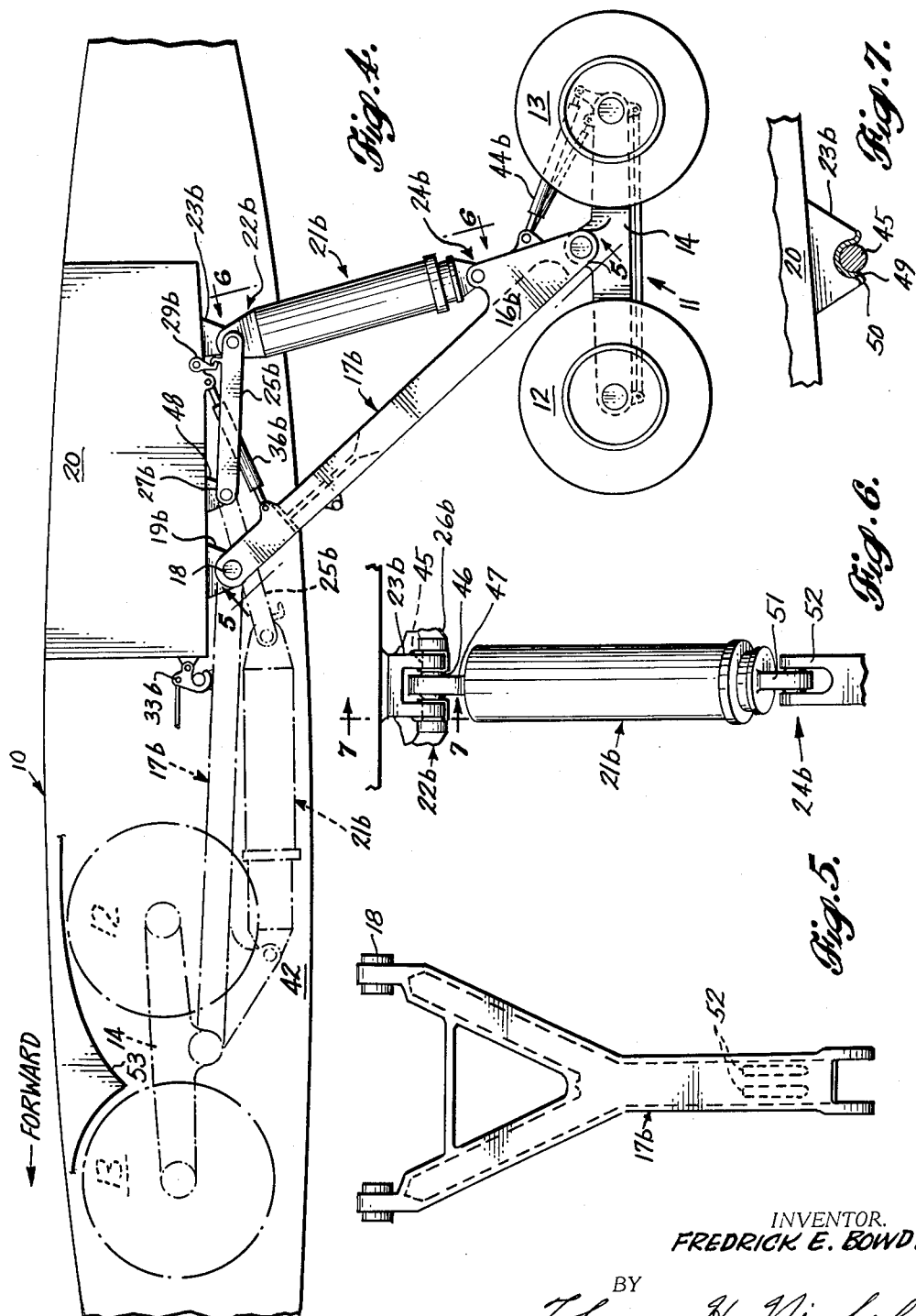

3,261,574
AIRCRAFT UNIVERSALLY JOINTED
RETRACTABLE LANDING GEAR
Frederick E. Bowdy, Seattle, Wash., assignor to The
Boeing Company, Seattle, Wash., a corporation of
Delaware
Filed Jan. 15, 1965, Ser. No. 425,910
28 Claims. (Cl. 244—102)

This invention relates to an aircraft retractable landing gear.

More particularly, this invention pertains to an aircraft retractable landing gear of a novel linkage and having at least one universal joint therein for a new distribution of loads and stresses through the landing gear.

With the advent of supersonic and faster aircraft, supporting landing gears for aircraft must be stronger and lighter.

Accordingly a primary object of this invention is to provide an aircraft landing gear utilizing means to prevent any strain or bending forces from entering the main shock strut due to side loads on, or deflections or misalignment of the landing gear as it supports the aircraft during landings, take-offs, and taxiing. This means in the disclosed invention comprises at least one universal joint. Thus one-third savings in weight over the conventional landing gear is achieved.

Another primary object of this invention is to provide a retractable landing gear in which the wheels are retracted forwardly of both the supporting pivots for the landing gear drag strut and shock strut. Likewise, the shock strut is extended during landing gear retraction to position the retracted wheels a distance farther forward from their extended position than the distance the wheels are raised. An inherent and important object of this invention is to provide a landing gear in which the wheels are retracted a greater distance forwardly from their extended position than the length of either their shock strut or their drag strut. Thus, only small wheel wells are required. Likewise, while the wheels are retracted to a forwardly position where required for C.G. (center of gravity) control, they thus may be mounted farther aft on the aircraft for greater wheel base or spread between the nose wheels and main wheels for maximum pitching stability on the ground.

In a retractable landing gear having a shock strut mounted between the aircraft primary structure and the wheels, another object of this invention is to provide a detachable connection at either end of the shock strut for additional extension of the landing gear during retraction to retract the wheels farther forward and to require a minimum depth wheel well.

Another object of the invention described in the preceding paragraph is to elongate the landing gear during forward retraction thereof by providing a translating link at the detachable end of the shock strut.

A further object of this invention is to provide a retractable landing gear having a drag strut of a width at least one-half the length thereof for absorption of all landing gear side forces, and torsional loads so that the use at any type of scissors or torsion links is obviated.

Other objects and various advantages of the disclosed aircraft universally jointed retractable landing gear will be apparent from the following detailed description, together with the accompanying drawings, submitted for purposes of illustration only and not intended to define the scope of the invention, reference being had for that purpose to the subjointed claims.

Briefly, this invention pertains to an aircraft retractable landing gear having a drag strut substantially half as wide as its length pivotally connected to a shock strut, the latter being mounted between universal joints whereby all side bending loads are absorbed by the drag strut leaving only vertical loads to be absorbed axially by the shock strut. Likewise, one end of the shock strut is disconnectible from either its lower connection to the drag strut adjacent the wheel truck as exampled by the embodiment of FIGS. 1–3, or from its upper connection to the aircraft as exampled by the embodiment of FIGS. 4–7. A translating link is utilized at the disconnectible end of the shock strut for retracting the wheels a greater distance forwardly from their extended position than upwardly from the extended position, even in advance of the pivots of both the drag strut and the shock strut. In fact, an inherent feature of this landing gear is that this distance forward which the wheels are retracted from their extended position is greater than the length of either their shock strut or their drag strut.

The drawings diagrammatically illustrate by way of example, not by way of limitation, two forms of the invention wherein like reference numerals designate corresponding parts in the several views in which:

FIG. 1 is a schematic left side view with parts deleted of one embodiment of the aircraft retractable landing gear illustrated in extended position in solid lines and in retracted position in broken lines, the front of the aircraft being to the left;

FIG. 2 is a schematic plan view of the drag strut per se taken at 2—2 on FIG. 1;

FIG. 3 is a schematic rear view of the shock strut taken at 3—3 on FIG. 1 illustrating in greater detail, with the translating link removed, and showing a ball joint at each end;

FIG. 4 is a schematic left side view with parts deleted of a second embodiment of the landing gear illustrated in extended position in solid lines and in retracted position in broken lines, the front of the aircraft being to the left;

FIG. 5 is a schematic plan view of the drag strut per se taken at 5—5 on FIG. 4;

FIG. 6 is a schematic rear view of the shock strut taken at 6—6 on FIG. 4 illustrating in greater detail a ball joint at each end thereof; and FIG. 7 is a schematic sectional view taken at 7—7 on FIG. 6 with parts deleted for clarity of disclosure.

The invention disclosed herein is not limited in its application to the details of construction and arrangement of parts shown and described, since the invention is capable of other embodiments and of being practiced or carried out in various other ways. Also it is to be understood that the phraseology or terminology employed herein is for the purpose of description and not of limitation.

FIG. 1 is a side view of the new retractable landing gear illustrated in extended position in solid lines and retracted position in broken lines, the front of the aircraft 10 being to the left. The preferred ground contacting elements are a conventional landing gear bogie 11, FIG. 1, shown on the left side of the aircraft 10, for example comprising two pairs of wheels 12 and 13 mounted at the fore and aft ends, respectively, of a truck beam 14 shown pivotally mounted with pivot 15 on the lower end 16a of a drag strut 17a. While the preferred bogie has four wheels, if so desired only two wheels in tandem, or more than two wheels on each axle may be utilized, depending on the particular design required.

Drag strut 17a, FIGS. 1 and 2, is formed at least half as wide as it is long with a trunnion joint pivotal connection 18 formed on the upper end thereof for pivotally connecting the strut to a projection 19, FIG. 1, on the main aircraft structure 20, whether it be wing structure or fuselage structure. Preferably, this main structure 20 is the main wing spar, or the aft spar if one is utilized.

A shock strut 21, FIG. 1, has a universal joint 22a on its upper end for connecting the shock strut to a yoke shaped projection 23a on the aft portion of the main structure 20. On the shock strut lower end is another universal joint 24 for connecting the strut to the lower end 26a of a translating link 25. The upper end 27 of translating link 25 is pivotally attached to the intermediate portion of the drag strut 17a.

While the universal joint 24a, FIG. 3, connects the lower end of the shock strut to the lower end 26a, FIG. 1, of the translating link 25a, the joint rests in a socket 28, FIG. 3, on the lower end 16a of the drag strut. The translating link 25a is deleted in FIG. 3 for clairty of disclosure. This socket 28, FIG. 3, and universal joint 24a, FIG. 1, is immediately over the pivotal connection 15 between the bogie 11 and drag strut lower end 16a.

The landing gear is locked down in the extended position by a down lock 29, FIG. 1. The dock lock 29, FIG. 3, comprises a forwardly spring biased latch 30, for example pivoted on pin 31 in the lower end 16 of the drag strut 17a for attaching to pin 32 protruding from the lower end 26 of the translating link 25. The latch 30 of down lock 29 is pilot operated rearwardly to unlatch by any suitable actuator (now shown). Pin 32 likewise comprises a part of the lower universal joint 24 between the shock strut 21 and the translating link 25. Thus with the shock strut 21, FIG. 1, locked in vertical position immediately over the wheel bogie 14, all vertical forces are transmitted straight up from the wheel bogie into and are absorbed by the shock absorber strut.

The drag strut 17a, particularly as shown in FIG. 2 has a width at least as great as, and preferably greater than one-half the length of the strut. In the preferred embodiment this width is at the trunnion joint 18. Accordingly, all side loads, deflections, or bending forces are absorbed by or passed through the drag strut and thus permit only vertical forces to pass through the shock strut.

A conventional uplock 33, FIG. 1, is attached to the forward side of the aircraft wing spar 20 for connecting to complementary pin 34 on drag strut 17a. While the pin 34 automatically locks in uplock 33 when the landing gear is fully retracted, manually operated lever 35 unlocks the uplock when the pilot desires to lower the landing gear. Likewise with the disclosed landing gear, upon unlocking of the uplock 33, the slip stream forces the gear to its fully down and extended position.

For retraction and extension of the landing gear, a conventional retracting motor 36, FIG. 1, such as but not limited to a hydraulic-pneumatic piston and cylinder actuator is connected between a pivot 37 on the aircraft main structure 20 and a pivot 38 on the back side and upper end of drag strut 17a.

An auxiliary retracting motor 39, FIG. 1, is provided, if so desired, particularly where additional force is required at the end of the retracting cycle. It is pivotally connected between lug 40 on the rear of aircraft main structure 20 and short arm 41 integral with the upper end of shock strut 21a. Upon extension of the auxiliary retracting motor 39, the shock strut is rotated clockwise about its upper pivotal mounting 22 to retract the landing gear forwardly.

Retraction of the aircraft landing gear bogie 11, FIG. 1, is accomplished by unlatching of down lock 29 followed by extension of retracting motor 36, whereby drag link 17a is rotated clockwise about its piovtal connection 18 to swing the wheel bogie 11 from its downwardly extended positiion to a forwardly position into the wheel well 42. Upon forward wheels 12 contacting wheel truck inverting means or cam 53, truck beam 14 is rotated clockwise on its pivot 15 to an inverted position as illustrated in broken lines in FIG. 1. With clockwise rotation of the drag strut 17a, translating link 25 pulls shock strut 21a off its seat on the lower end 16 of the drag strut, extending the shock strut substantially, and is actuated forward until the translating link is practically collinear with the shock strut. Upon the landing gear reaching its full up position, uplock pin 34 snaps into its corresponding latch 33 to lock the landing gear in retracted position. Thus for a majority of the length of the landing gear storage well and particularly in the vicinity of the wing main structure 20, only a shallow well portion is available and required to store the shock strut, translating link, drag strut, and retracting motor. A shorter deep portion of the wheel well is required only far forward for the wheels.

Accordingly, the shock strut is extended during retraction of the landing gear for retracting the wheels a greater distance forwardly from their extended position than the distance upwardly from their extended position. Accordingly, an inherent feature of the disclosed landing gear is that due to the particular linkage, the wheels are retracted a greater distance forwardly from their extended position than if they were pivoted from either the shock strut alone or the drag strut alone. In addition, a short strong landing gear is set forth providing a long wheel base.

For extension of the landing gear, uplock 33, FIG. 1, is unlocked to release the landing gear from within the landing gear well and the drag strut with the rest of the landing gear connected thereto is rotated counterclockwise to the fully extended position by gravitational forces, retracting of the shock strut per se providing a cushioning deceleration means at the landing gear terminal or fully extended position. In addition to the forces of gravity, the retraction of the retracting motor 36 ensures positive extension of the landing gear and locking in the down position by snapping of pin 32, FIG. 3, into latch 30 of the down lock 29. Likewise auxiliary actuator 39, FIG. 1, is contracted to provide full extension, if so required.

Conventional brake rods 43 and 44 are utilized. If so desired, rod 44 may also include a centering cylinder and snubber assembly for the landing gear bogie.

The second embodiment of the landing gear is disclosed in FIGS. 4–7 wherein the landing gear bogie 11, FIG. 4, comprises wheels 12 and 13 on truck beam 14, all parts being identical to those in FIG. 1. The truck beam 14 is pivotally mounted with pin 15 on the lower end of drag strut 17b, and the upper end of the drag strut is pivotally mounted with pin 18 on forward-most projection 19b on the under surface of aircraft main structure 20, all similar to corresponding parts on FIG. 1.

While the shock strut 21b, FIG. 4, is similar to that on FIG. 1, the upper and lower universal joints, 22b and 24b, respectively, at the ends of the shock strut are slightly different as disclosed hereinafter. Universal joint 22b comprises a yoke shaped lower end of translating link 25b having a bar 45 secured in the yoke with a ball 46 in the center of the bar. Around ball 46 is rotatably mounted a flat headed perforated rod 47 forming the top of the shock strut 21b. The upper end 27b of translating link 25b is pivotally connected to a lug 48 on the under surface of aircraft main structure 20. Landing gear extending-retracting actuator 36b, FIG. 4, is conventional and connected between the main structure 20 and drag strut 17b similar to the actuator 36a of the embodiment of FIG. 1. The universal joint 22b, FIG. 4, is forced up by landing gear extending actuator 36b against yoke shaped projection 23b, FIGS. 6 and 7, on the under surface of main structure 20 by the portions of the bar 45, FIGS. 6 and 7, spaced between the center mounted ball and the ends of the yoke 26b, FIG. 6, resting in complementary socket 49, FIG. 7, in the projection 23b.

A wear strip 50 lines socket 49 in which pin 45 rides when the landing gear is extended.

A landing gear conventional down lock 29b mounted to the under surface of main structure 20 is provided to lock the translating link and accordingly the shock strut firmly up against the main structure when the landing gear is extended, and for unlocking by the pilot when he desires to retract the landing gear.

A universal joint 23b, FIG. 4, connects the lower end of shock strut 21b to the lower end 16b of drag strut 17b, and is similar to the upper universal joint in the first embodiment shown in FIG. 2. Another flat headed perforated rod 51 similar to rod 47, but projecting from the lower end of the shock strut instead has a ball mounted therein. This ball is likewise rotatably mounted between the ends of yoke 52, which is integral with the drag strut lower end 16b.

The drag strut 17b, FIG. 5, is similar to that of the first embodiment in that its width, as at the trunnion end for example is substantially one-half the strut length. Thus the drag strut has sufficient strength to absorb all landing gear side forces. Likewise, all torsional loads are absorbed by the drag strut to obviate the necessity of torque links on the shock strut leaving only vertical axial loads to be absorbed by the shock strut.

For retraction of the landing gear of the embodiment of FIGS. 4–7, the down lock 29b, FIG. 4, is unlocked and the retracting-extension actuator 36b expanded or extended to rotate drag strut 17b clockwise about its pivot 18 to the far forward position illustrated in broken lines. Drag strut 17b pulls shock strut 21b downwardly out of socket 49, forwardly, and upwardly with translating link 25b trailing behind to the fully retracted position and simultaneously elongating the shock strut to where the shock strut and translating link are practically collinear relative to each other. In this latter embodiment, like the first embodiment, the forward wheels 12, FIG. 4, contact cam 53 for rotating the wheel bogie 11 to a position 180° from its fully extended position, and uplock 33b locks the landing gear up in its wheel well 42.

For extension of the landing gear of FIGS. 4–7, the uplock 33b, FIG. 4, is unlocked to allow the bogie to extend by gravitational forces to the fully extended position. However, for reliability purposes actuator 36b contracts to positively rotate drag strut 17b counterclockwise aft. Simultaneously, the pivotally connected shock strut 21b, and translating link 25b are folded from their collinear position to practically a right angle position with the bar 45 of the shock strut upper end fitting into socket 49 of the aircraft main structure 20. As the fully extended position is reached, down lock 33b is actuated to lock the landing gear in fully extended position.

A conventional brake rod and/or centering and snubber assembly 44b is utilized as required.

An auxiliary retracting and extending actuator may be incorporated in the embodiment of FIGS. 4–7 similar to actuator 39 of FIG. 1 if the design so requires.

In summary, an aircraft landing gear of one third less weight is disclosed because of the elimination of scissors or torque links and the forming of a wider drag strut permitting a smaller shock strut, the universally mounted shock strut absorbing only vertical axial loads or forces, all other loads as torsional forces, and side loads being absorbed by the drag strut. In addition, due to one or the other ends of the shock strut being detachably connected in effect, the retracted bogie wheels are positioned a distance farther forward from their extended position than the distance the wheels are raised, or expressing it more accurately, the wheels are retracted a greater distance forwardly from their extended position than the length of either their shock strut or their drag strut, whereby it is only necessary to provide a shallow wheel well for the greatest portion thereof and also for providing a greater wheel base.

While only two embodiments of the invention have been shown in the accompanying drawings, it will be evident that various other modifications are possible in the arrangement and construction of the disclosed aircraft universally jointed retractable landing gear without departing from the scope of the invention.

I claim:
1. A landing gear for an aircraft comprising;
(a) drag strut means for receiving drag and side loads,
(b) trunnion joint means for connecting one end of said drag strut to the aircraft,
(c) wheel means for the other end of said drag strut means,
(d) shock strut means for receiving vertical loads,
(e) universal joint means between one end of said shock strut and said drag strut,
(f) universal joint means between the other end of said shock strut and the aircraft,
(g) translating link means pivotally connected to said shock strut means, and
(h) landing gear retracting means, said landing gear retracting means being responsive to said translating link means for retracting said wheel means a greater distance forwardly from its extended position than the length of said shock strut means.

2. A landing gear as recited in claim 1 wherein;
(a) the width of said trunnion joint means is at least one-half the length of said drag strut means for taking all side forces.

3. A landing gear as recited in claim 1 wherein;
(a) said trunnion joint means and said universal joint means forms means for transmitting all side forces between said wheels and the aircraft through said drag strut means and for transmitting only vertical forces through said shock strut means.

4. A landing gear as recited in claim 1 wherein;
(a) said landing gear retracting means is connected between said drag strut means and the aircraft for retracting said wheel means forwardly into the aircraft whereby the wheel means may free fall to extended position.

5. A landing gear as recited in claim 4 wherein;
(a) uplock means are provided for said landing gear,
(b) said uplock means comprising means for locking said drag strut means to the aircraft when the landing gear is retracted.

6. A landing gear as recited in claim 4 wherein;
(a) down lock means are provided for said landing gear,
(b) said down lock means comprising means for locking said drag strut means in the extended position.

7. A landing gear as recited in claim 1 wherein;
(a) said trunnion joint means and said universal joint means forming means for preventing all side bending loads from being imposed on said shock strut means.

8. A landing gear as recited in claim 1 wherein;
(a) said translating link means becomes substantially collinear with said shock strut means when said landing gear is in the retracted position for providing the minimum depth wheel well required for the retracted landing gear in the aircraft.

9. A landing gear for an aircraft comprising;
(a) drag strut means,
(b) trunnion means for pivotally connecting one end of said drag strut means to the aircraft,
(c) wheel means, pivot means for connecting said wheel means to the other end of said drag strut means,
(d) a shock strut means,
(e) first universal joint means, said joint means being aft of said trunnion means for connecting one end of said shock strut means to the aircraft,
(f) second universal joint means for connecting the other end of said shock strut means to said drag strut means,
(g) translating link means pivotally connected to said shock strut means, and
(h) landing gear retracting means, said landing gear retracting means being responsive to said translating link means for retracting said wheel means a greater distance forwardly from its extended position than the length of said drag strut means.

10. A landing gear as recited in claim 9 wherein;
(a) said retracting means comprising an actuator, (b) one end of said actuator being pivotally connected to the aircraft, (c) the other end of said actuator being pivotally connected to said drag strut means adjacent to the upper end thereof for extending and retracting the landing gear.

11. A landing gear for an aircraft comprising;
(a) drag strut means,
(b) trunnion means for pivotally connecting one end of said drag strut means to the aircraft,
(c) wheel truck means, pivot means for connecting said wheel truck means to the other end of said drag strut means,
(d) shock strut means,
(e) first universal joint means, said joint means being aft of said trunnion means for connecting one end of said shock strut means to the aircraft,
(f) second universal joint means for connecting the other end of said shock strut means to said drag strut means,
(g) means for retracting and extending said wheel truck means,
(h) wheel truck inverting means secured on the aircraft for contact by said landing gear wheels when being moved to retracted position,
(i) said wheel truck inverting means being responsive to contact therewith by said retracting wheels for rotating said wheel truck means about said wheel truck pivot means to a retracted position of substantially 180° from the wheel truck extended position.

12. A landing gear for an aircraft comprising;
(a) drag strut means,
(b) trunnion means for pivotally connecting one end of said drag strut means to the aircraft,
(c) wheel means for the other end of said drag strut means,
(d) shock strut means,
(e) first universal joint means, said joint means being aft of said trunnion means for connecting one end of said shock strut means to the aircraft,
(f) second universal joint means for connecting the other end of said shock strut means to said drag strut means,
(g) means for retracting and extending said wheel means,
(h) one of said universal joint means includes a translating link means,
(i) one end of said translating link means being connected to one end of said shock strut means, and
(j) said retracting means being responsive to said translating link means for retracting said wheel means a greater distance forwardly from its extended position than the length of said drag strut.

13. A landing gear for an aircraft comprising;
(a) a drag strut means,
(b) trunnion means for pivotally connecting one end of said drag strut means to the aircraft,
(c) wheel means for the other end of said drag strut means,
(d) shock strut means,
(e) first universal joint means, said joint means being aft of said trunnion means for connecting one end of said shock strut means to the aircraft,
(f) second universal joint means for connecting the other end of said shock strut means to said drag strut means,
(g) means for retracting and extending said wheel means,
(h) said second universal means includes a translating link,
(i) one end of said translating link being pivotally connected to the lower end of said shock strut means,
(j) the other end of said translating link being pivotally connected intermediate the ends of said drag strut means,
(k) said landing gear retracting means being responsive to said translating link for retracting said wheel means a distance forwardly and a distance upwardly from the wheels extended position, said distance forwardly being greater than said distance upwardly.

14. A landing gear for an aircraft comprising;
(a) drag strut means,
(b) trunnion means for pivotally connecting one end of said drag strut means to the aircraft,
(c) wheel means for the other end of said drag strut means,
(d) shock strut means,
(e) first universal joint means, said joint means being aft of said trunnion means for connecting one end of said shock strut means to the aircraft,
(f) second universal joint means for connecting the other end of said shock strut means to said drag strut means,
(g) means for retracting and extending said wheel means,
(h) said second universal joint means comprises a ball and socket joint,
(i) said ball and socket joint comprising a socket formed on the lower end of said drag strut means and a ball shaped portion formed on the lower end of said shock strut means whereby said shock strut means rests on said drag strut means in the landing gear extended position and said shock strut means is separated from said drag strut means in the landing gear retracted position.

15. A landing gear for an aircraft comprising;
(a) drag strut means,
(b) trunnion means for pivotally connecting one end of said drag strut means to the aircraft,
(c) wheel means for the other end of said drag strut means,
(d) shock strut means,
(e) first universal joint means, said joint means being aft of said trunnion means for connecting one end of said shock strut means to the aircraft,
(f) second universal joint means for connecting the other end of said shock strut means to said drag strut means,
(g) means for retracting and extending said wheel means,
(h) said first universal joint means includes a ball and socket joint,
(i) the top of said shock strut means having a ball shaped portion, and
(j) the aircraft having a socket thereon for receiving said ball shaped portion when the landing gear is extended and for disemboguing said ball shaped portion when the landing gear is retracted.

16. A landing gear for an aircraft comprising;
(a) drag strut means,
(b) trunnion means for pivotally connecting one end of said drag strut means to the aircraft,
(c) wheel means for the other end of said drag strut means,
(d) shock strut means,
(e) first universal joint means, said joint means being aft of said trunnion means for connecting one end of shock strut means to the aircraft,
(f) second universal joint means for connecting the other end of said shock strut means to said drag strut means,
(g) means for retracting and extending said wheel means,
(h) said first universal joint means includes a translating link,
(i) one end of said translating link being pivotally connected to the top of said shock strut means, and (j) the other end of said translating link being pivotally connected to the aircraft,
(k) said retracting means being responsive to said translating link for lengthening said shock strut means during retraction.

17. A landing gear for an aircraft comprising;
(a) a truck of wheels,
(b) drag strut means, said drag strut being pivotally connected between the aircraft and said truck of wheels,
(c) a shock strut, said shock strut means having universal joint connections with both said drag strut means and the aircraft,
(d) translating link means for one of said universal joint connections, and
(e) landing gear retracting means, said landing gear retracting means being responsive to said translating link means for retracting said truck of wheels a greater distance forwardly from its extended position than the length of said shock strut means.

18. A landing gear as recited in claim 17 wherein;
(a) one of said universal joint connections being detachable whereby during retraction said wheels are positioned a greater distance forwardly from their extended position than upwardly from their extended position.

19. A retractable landing gear for an aircraft comprising;
(a) a drag strut,
(b) the upper end of staid drag strut comprising a trunnion joint, said trunnion joint connecting said drag strut to the aircraft,
(c) a truck of wheels, said truck of wheels being pivotally connected to the lower end of said drag strut,
(d) a shock strut,
(e) a first pivotal connection between the upper end of said shock strut and the aircraft, said first pivotal connection being positioned aft of said trunnion joint connection,
(f) a second pivotal connection between the lower end of said shock strut and said drag strut, said second pivotal connection being intermediate the ends of said drag strut,
(g) translating link means for one of said pivotal connections, and
(h) landing gear retracting means, said landing gear retracting means being responsive to said translating link means for retracting said truck of wheels a greater distance forwardly from its extended position than the length of said shock strut means.

20. A landing gear for an aircraft comprising;
(a) a drag strut,
(b) the upper end of said drag strut comprising a trunnion joint, said trunnion joint connecting said drag strut to the aircraft,
(c) a truck of wheels, said truck of wheels being pivotally connected to the lower end of said drag strut,
(d) a shock strut,
(e) a first pivotal connection between the upper end of said shock strut and the aircraft, said first pivotal connection being positioned aft of said trunnion joint connection,
(f) a second pivotal connection between the lower end of said shock strut and said drag strut, said second pivotal connection being intermediate the ends of said drag strut,
(g) landing gear retracting means,
(h) one of said pivotal connections includes a translating link means,
(i) one end of said translating link means being connected to one end of said shock strut, and
(j) said retracting means being responsive to said translating link means for retracting said truck of wheels a greater distance forwardly from its extended position than the length of said shock strut.

21. A retractable landing gear for an aircraft comprising;
(a) a drag strut,
(b) the upper end of said drag strut comprising a trunnion joint, said trunnion joint connecting said drag strut to the aircraft,
(c) a truck of wheels, said truck of wheels being pivotally connected to the lower end of said drag strut,
(b) a shock strut,
(e) a first pivotal connection between the upper end of said shock strut and the aircraft, said first pivotal connection being positioned aft of said trunnion joint connection,
(f) a second pivotal connection between the lower end of said shock strut and said drag strut, said second pivotal connection being intermediate the ends of said drag strut,
(g) landing gear retracting means,
(h) said first pivotal connection includes a translating link,
(i) one end of said translating link being pivotally connected to the upper end of said shock strut, and
(j) the other end of said translating link being pivotally connected to the aircraft whereby said translating link becomes substantially collinear with said drag strut during retraction.

22. A retractable landing gear for an aircraft comprising;
(a) a drag strut,
(b) the upper end of said drag strut comprising a trunnion joint, said trunnion joint connecting said drag strut to the aircraft,
(c) a truck of wheels, said truck of wheels being pivotally connected to the lower end of said drag strut,
(d) a shock strut,
(e) a first pivotal connection between the upper end of said shock strut and the aircraft, said first pivotal connection being positioned aft of said trunnion joint connection,
(f) a second pivotal connection between the lower end of said shock strut and said drag strut, said second pivotal connection being intermediate the ends of said drag strut,
(g) means for extending and retracting said truck of wheels,
(h) said second pivotal connection comprises a translating link,
(i) one end of said translating link being pivotally connected to the lower end of said shock strut,
(j) the other end of said translating link being pivotally connected to said drag strut intermediate the ends of said drag strut,
(k) the lower end of said shock strut being ball shaped, and
(l) a socket on said drag strut for receiving said shock strut ball end forming a ball-socket joint whereby said ball end rests in said socket when the landing gear is in extended position and said translating link extracts said ball end from said socket when the landing gear is retracted.

23. A retractable landing gear as recited in claim 22 wherein;
(a) said drag strut has locking means for locking said shock strut ball shaped end in said drag strut socket when the landing gear is in extended position and for unlocking said ball-socket joint for retraction of the landing gear.

24. A retractable landing gear for an aircraft comprising;
(a) a drag strut,
(b) the upper end of said drag strut comprising a trunnion joint, said trunnion joint connecting said drag strut to the aircraft,
(c) a truck of wheels, said truck of wheels being pivotally connected to the lower end of said drag strut,
(d) a shock strut,
(e) a first pivotal connection between the upper end of said shock strut and the aircraft, said first pivotal connection being positioned aft of said trunnion joint connection,
(f) a second pivotal connection between the lower end of said shock strut and said drag strut, said second pivotal connection being intermediate the ends of said drag strut,
(g) means for extending and retracting said truck of wheels,
(h) said first pivotal connection includes a ball and socket joint,
(i) the top of said shock strut having a ball shaped portion, and
(j) a socket formed on the aircraft for receiving said shock strut ball portion when the landing gear is extended and for disemboguing said shock strut ball portion when the landing gear is retracted.

25. A landing gear for an aircraft comprising;
(a) drag strut means, said drag strut means having trunnion means for connecting said drag strut means to the aircraft,
(b) wheel truck means for said drag strut means,
(c) shock strut means for said aircraft,
(d) universal joint means for connecting said shock strut means between the aircraft and said drag strut means, and
(e) said trunnion means and said universal joint means comprising means for transmitting all side forces between said wheel truck means and the aircraft through said drag strut means and comprising means for transmitting only vertical forces through said shock strut means,
(f) translating link means pivotally connected to said shock strut means, and
(g) landing gear retracting means, said landing gear retracting means being responsive to said translating link means for retracting said wheel means a greater distance forwardly from its extended position than the length of said shock strut means.

26. A landing gear for an aircraft comprising;
(a) drag strut means for the aircraft,
(b) wheel means for said drag strut means,
(c) shock strut means for the aircraft, pivotal means for pivotally connecting said shock strut means between the aircraft and said drag strut means,
(d) wheel retracting means for the aircraft, and
(e) said wheel retracting means being responsive to said shock strut pivoted means and said drag strut means for retracting said wheel means a greater distance forwardly from its extended position than the length of said drag strut means.

27. A retractable landing gear for an aircraft comprising;
(a) wheel means pivotally connected to the airplane with drag strut means and shock strut means,
(b) translating link means pivotally connected to said shock strut means, and
(c) landing gear retracting means, said landing gear retracting means being responsive to said translating link means for retracting said wheel means a greater distance forwardly from its extended position than the length of said shock strut means.

28. A retractable landing gear for an aircraft comprising;
(a) wheel means pivotally connected to the airplane with drag strut means and shock strut means,
(b) translating link means pivotally connected to said shock strut means, and
(c) landing gear retracting means, said landing gear retracting means being responsive to said translating link means for retracting said wheel means a greater distance forwardly from its extended position than the length of said drag strut means.

References Cited by the Examiner

UNITED STATES PATENTS

| | | | |
|---|---|---|---|
| 2,242,125 | 5/1941 | Hineman | 244—102 |
| 2,506,178 | 5/1950 | Shaw | 244—102 X |
| 2,752,112 | 6/1956 | Payne | 244—102 |
| 2,869,806 | 1/1959 | Beach | 244—102 |

FOREIGN PATENTS 1,263,772  5/1961  France.

References Cited by the Applicant

UNITED STATES PATENTS 2,690,887  10/1954  Perdue.
3,086,733  4/1963  Hartel.

FOREIGN PATENTS 502,567  3/1939  Great Britain.
742,309  12/1955  Great Britain.

MILTON BUCHLER, *Primary Examiner.*

L. C. HALL, *Assistant Examiner.*